(12) United States Patent
Woods et al.

(10) Patent No.: US 12,296,570 B2
(45) Date of Patent: May 13, 2025

(54) SYSTEMS AND METHODS FOR SUBSTRATE MOVEMENT FOR DECORATION

(71) Applicant: ACTEGA North America Technologies, Inc., Cinnaminson, NJ (US)

(72) Inventors: Michael Clarke Woods, Saunderstown, RI (US); Michael Medeiros, Mattapoisett, MA (US)

(73) Assignee: ACTEGA North America Technologies, Inc., Cinnaminson, NJ (US)

( * ) Notice: Subject to any disclaimer, the term of this patent is extended or adjusted under 35 U.S.C. 154(b) by 92 days.

(21) Appl. No.: 18/351,618

(22) Filed: Jul. 13, 2023

(65) Prior Publication Data

US 2024/0025166 A1 Jan. 25, 2024

Related U.S. Application Data (60) Provisional application No. 63/391,013, filed on Jul. 21, 2022.

(51) Int. Cl.
  *B32B 37/00* (2006.01)
  *B32B 37/12* (2006.01)

(52) U.S. Cl.
  CPC ........ *B32B 37/0053* (2013.01); *B32B 37/025* (2013.01); *B32B 37/12* (2013.01); *B32B 2451/00* (2013.01)

(58) Field of Classification Search
  CPC ............ B32B 2451/00; B32B 37/0053; B32B 37/025; B32B 37/12; B65C 9/30
  See application file for complete search history.

(56) References Cited

U.S. PATENT DOCUMENTS

| | | | | |
|---|---|---|---|---|
| 1,679 | A | * 7/1840 | Perkins | .................. B32B 37/12 156/549 |
| 2024/0025166 | A1* | 1/2024 | Woods | .................. B32B 37/12 |

FOREIGN PATENT DOCUMENTS

| | | |
|---|---|---|
| KR | 101776678 B1 | 9/2017 |
| WO | WO 2018/195469 A2 | 10/2018 |

OTHER PUBLICATIONS

International Search Report and Written Opinion for International Application No. PCT/US2023/028016, mailed Nov. 10, 2023.

* cited by examiner

*Primary Examiner* — Sonya M Sengupta
(74) *Attorney, Agent, or Firm* — Wolf, Greenfield & Sacks, P.C.

(57) ABSTRACT

Systems and methods for applying decorations onto substrates. Decorations can be transported on a web along the web path to an application station at which the decorations are applied to substrates. Movement of substrates through the application station can be controlled by rollers that are movable to permit and/or prevent entry to the application station and/or exit from the application station. The rollers can urge a substrate into contact with a decoration, and movement of the decoration and web at the application station can cause rotation of the substrate during decoration transfer.

22 Claims, 5 Drawing Sheets

SYSTEMS AND METHODS FOR SUBSTRATE MOVEMENT FOR DECORATION

FIELD

Disclosed embodiments are related to systems and methods for decorating substrates.

BACKGROUND

Adhesive labels are widely used, such as for providing information and/or decoration on substrates such as bottles and other containers, packages, and so on. In some applications, decorations such as labels are formed at a printing facility, which provides the labels on a continuous web that may be rolled onto a spool. During a subsequent labeling process, the web is unwound from the spool and guided through a pre-defined path to a location at which the labels are removed from the web and applied to the substrate.

The labels typically have an adhesive side, whether formed by a pressure-sensitive adhesive (PSA), a glue applied to the label or a thermally-activated or fluid-activated adhesive, that serves to secure the label to a box, product or other substrate. When the label is applied to the substrate, the adhesive side may be exposed, e.g., by peeling the label from the web or by removing a liner from the adhesive side. In certain applications, the adhesive side may be non-tacky until just prior to applying the label, at which time the adhesive is activated (e.g., by applying heat or an activation fluid) and the label is applied to the substrate.

SUMMARY

Aspects described herein relate to systems and methods for decorating substrates.

According to some embodiments, decorations (e.g., labels) may be formed on a web (e.g., a film, belt or other suitable web substrate) at one or more decoration forming stations positioned along a web path, and the decorations may be subsequently applied to substrates at an application station positioned along the web path after the decoration forming station(s). In this manner, a single system may be used to both form the decorations and apply the decorations to substrates. In some embodiments, decorations may be formed in advance on a web and then later applied to substrates using a separate decoration application system. Thus, two or more separate systems may be used to produce decorations on a web, and to apply those pre-formed decorations onto substrates.

Decorations may be formed in any suitable way on a web. Printers such as inkjet, flexographic or other suitable printing systems can be used to deposit one or more decoration layers on the web to form a decoration. The decorations may include one or more decoration layers formed in register with one another on the web to form the decoration. Moreover, the decorations include an adhesive layer, such as a pressure sensitive adhesive layer, formed in register with the one or more decoration layers. The adhesive layer can be activatable such that the adhesive is initially deposited as a coating and subsequently activated to become tacky, e.g., by way of a solvent, UV light, heat, etc. Prior to application of the decorations to the substrates, the adhesive layer is exposed on a surface of the decoration facing outwardly from the web. When a decoration is applied to a substrate at the application station, the adhesive layer can be brought into contact with a surface of the substrate to adhere the decoration to the substrate as it is released from the web. For example, in embodiments employing a pressure sensitive adhesive layer, an adhesion between the pressure sensitive adhesive layer and the substrate may be sufficient to pull the decoration from the web, thereby releasing the decoration from the web.

Each decoration formed on the web may include a single element that may be applied to a substrate at the application station, or each decoration can include multiple discrete elements that are separate from each other though initially supported on the web and transferred to the same substrate. Each element of a decoration may include one or more decoration layers and a pressure sensitive adhesive layer formed in register with one another to form the decoration element. In some instances, the term "label" may be used to refer to a decoration; accordingly, as used herein, the terms "decoration" and "label" have the same meaning and may be used interchangeably. Thus, in some cases, a label may include a single element or multiple elements that are transferred together to a substrate. Moreover, it should be understood that the term decoration does not necessarily refer to "decorating" an item in any particular aesthetic sense. For example, a decoration may provide visible graphics, text, colors, optical effects (like diffraction that gives a rainbow effect), machine readable indicia (such as a barcode), tactile effects, topographical features, and so on.

As noted above, decorations on the web can be applied to substrates at an application station positioned along a web path of the web. In some instances, applying a decoration to a substrate may involve directly transferring the decoration to the substrate from the web. In such embodiments, the decoration is always supported by either the web or the substrate. In other instances, a decoration may be partially or completely separated from the web prior to being applied to the substrate. For example, a portion of a decoration may be separated from the web prior to being applied to the substrate to aid in releasing the decoration from the web when the decoration is applied to the substrate. Moreover, in some instances, multiple portions of a decoration (e.g., separate discrete portions) may be applied to a substrate in a single application or the separate portions may be applied in separate application steps at the application station.

In some embodiments, a method for decorating a substrate includes moving a first roller to an extended position at an application station and moving a substrate along a substrate path toward the first roller at the application station. With the first roller in the extended position, the first roller can be located in the substrate path on a downstream side of the substrate. The substrate can be moved along the substrate path so the substrate contacts the first roller, which can stop movement of the substrate along the substrate path, or the substrate can be moved to a location adjacent to but not in contact with the first roller. A second roller can be moved to an extended position at the application station, and with the second roller in the extended position, the second roller can be located in the substrate path on an upstream side of the substrate. For example, the substrate can be trapped or otherwise located in a space between the first and second rollers (as well as a portion of the web) with the first and second rollers in an extended position. A portion of a web bearing a decoration can be moved at the application station to transfer the decoration to the substrate, and the substrate can be rotated during transfer of the decoration from the web to the substrate. During rotation of the substrate, the first and second rollers can contact the substrate and urge the substrate into contact with the decoration and the web. In some cases, movement of the web and decoration at the application station can drive rotation of the substrate, e.g., friction between the substrate and web can cause the substrate to rotate as the web moves. The first and second rollers can support the substrate during rotation and can urge the substrate into contact with the web to effect decoration transfer to the substrate. After decoration transfer, the first roller can be moved to a retracted position that is out of the substrate path, e.g., so that the substrate bearing the decoration can be moved along the substrate path and away from the application station.

In some embodiments, when in the extended position, the first roller can be positioned to prevent the substrate from moving past the first roller to exit application station. For example, the substrate can be blocked by a portion of the first roller in the extended position and optionally a portion of the web or other component from exiting the application station. In some cases, the substrate can be moved along a first direction toward the first roller, and the first roller can be moved in a direction transverse to the first direction when moving to the extended position.

In some cases, a portion of the web bearing the decoration can be positioned between the substrate and a support surface at the application station. The support surface, along with the first and second rollers in the extended position, can be configured to urge the substrate into contact with the portion of the web and the decoration at the application station. In some embodiments, the support surface includes a third roller, a belt or plate, e.g., that urges the web into contact with the substrate at the application station.

In some embodiments, after transfer of the decoration to the substrate, the second roller can be moved to a retracted position that is out of the substrate path to permit a second substrate to be moved toward the first roller at the application station. Thus, the second roller can act as a gate or other component to control movement of substrates toward the first roller.

In some cases, the decoration includes an adhesive that is exposed and is on a side of the decoration opposite the web. The exposed adhesive can cause transfer of the decoration to the substrate, e.g., the adhesive can adhere to the substrate and pull the decoration from the web. Thus, the decoration can be transferred directly from the web to the substrate.

In some embodiments, a system for decorating substrates includes a web with a plurality of decorations on a first side of the web. Each decoration can have an adhesive exposed on a surface of the decoration facing outwardly from the first side of the web. The system can include an application station at which the decorations are applied from the web to substrates, and a web path along which the web travels to transport the decorations to the application station. A web control system can be configured to control movement of the web along the web path, and a substrate transport can be configured to move a substrate along a substrate path to the application station and from the application station. First and second rollers can be located at the application station that are independently movable between respective extended and retracted positions. In some cases, the first and second rollers can be positioned in the substrate path in the extended position and can be positioned out of the substrate path in the retracted position.

In some embodiments, a controller can be configured to control operation of the web control system and the first and second rollers to cause decorations to be transferred from the web to substrates at the application station. For example, the controller can be configured to move the first roller to the extended position and into the substrate path to contact a substrate moved to the application station by the substrate transport and prevent the substrate from exiting the application station prior to transfer of a decoration to the substrate. The controller can also cause the second roller to move to the extended position after the substrate is positioned in a space between the first and second rollers, and to move the first roller to the retracted position out of the substrate path after transfer of the decoration to the substrate to permit the substrate to exit the application station.

In some cases, the first and second rollers and the web path can be configured such that the substrate is trapped between the first and second rollers and the web with the substrate in contact with the first roller and the first and second rollers in the extended position. In some embodiments, the substrate transport includes a conveyor that moves the substrates in a linear direction to the application station and from the application station. The conveyor can be configured to move substrates toward the first roller in the extended position. In some cases, the first and second rollers can be movable in directions transverse to a linear direction along which substrates can be moved to the application station.

In some embodiments, a controller can be configured to move the web and a decoration at the application station with a substrate in contact with the first roller and the first and second rollers in the extended position to transfer the decoration to the substrate. In some cases, the web, web path and first and second rollers can be configured such that movement of the web and decoration at the application station causes the substrate to rotate during transfer of the decoration to the substrate. In some embodiments, the web path includes a support surface arranged to urge the web and decoration into contact with the substrate at the application station with the first and second rollers in the extended position. For example, the support surface can include a third roller, a belt or plate that is positioned on a side of the web opposite the substrate to urge the web into contact with the substrate. In some embodiments, a controller can be configured to move the first roller to the extended position and subsequently move the second roller to the extended position to trap the substrate between the first and second rollers and a portion of the web (and/or a portion of the support surface) at the application station before the decoration is transferred to the substrate.

Moreover, as described in more detail below, the systems described herein may further include one or more features configured for web accumulation and/or control of the tension of the web. For example, such features may include one or more web festoons positioned along a web path before the decoration forming stations, between decoration forming stations and/or curing stations, between a decoration forming station and an application station or curing station, between a curing station and an application station, and/or after an application station.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

It should be understood that aspects of the disclosure are described herein with reference to the figures, which show illustrative embodiments. The illustrative embodiments described herein are not necessarily intended to show all embodiments, but rather are used to describe a few illustrative embodiments. Thus, aspects of the disclosure are not intended to be construed narrowly in view of the illustrative embodiments. In addition, it should be understood that aspects of the disclosure may be used alone or in any suitable combination with other aspects of the invention.

In some embodiments, decorations such as labels may be formed on a web. Each label may include a layer of an adhesive, and the adhesive layer may be exposed on the web and on the decoration. The decorations may be formed on the web in any suitable way. For example, the decorations may include a first decoration layer formed on the web, and this first decoration layer may form the outer surface of the decoration when the decoration is applied to a substrate. This first decoration layer may be optically clear or colored. One or more indicia layers may be provided on the first decoration layer, followed by an adhesive layer formed on the indicia layer(s). In this manner, the decorations may be reverse printed or otherwise formed on the web and may feature an exposed adhesive layer which may be located between the substrate and the indicia and first decoration layers when the decoration is applied to the substrate. In some instances, a release layer may be provided between the web and the first decoration layer to facilitate release of the decorations from the web when the decorations are applied to substrates. For example, decorations such as labels and webs which may be used with the systems provided herein are described in U.S. Patent Application Pub. No. 2016/0335927, which is hereby incorporated by reference in its entirety. However, it should be understood that other types of decorations may be suitable, as the current disclosure is not limited to any particular arrangement and/or method for forming decorations. For example, other suitable types of decorations may include decorations formed by techniques including, but are not limited to, hot or cold foil stamping, flexographic printing, embossing, and/or inkjet printing.

Decorations may bear any suitable visible or non-visible information, such as text, graphics, electronic circuitry (such as an RFID device), etc. Moreover, a decoration may be provided as a single, continuous piece of material applied to a substrate, or alternatively, the decoration may be formed as a plurality of separate decoration components which collectively form the decoration. It should be understood that the systems described herein may be suitable for applying decorations to any suitable substrates, such as bottles or other containers (including irregularly shaped containers), boxes, envelopes, or other packaging materials, products for sale, etc. Moreover, the substrates may be formed from any suitable material, including, but not limited to, paper-based materials, glass, metallic materials (such as aluminum and steel), and polymeric materials (such as PET, PETE, LDPE, HDPE, and PS).

Figure 1:
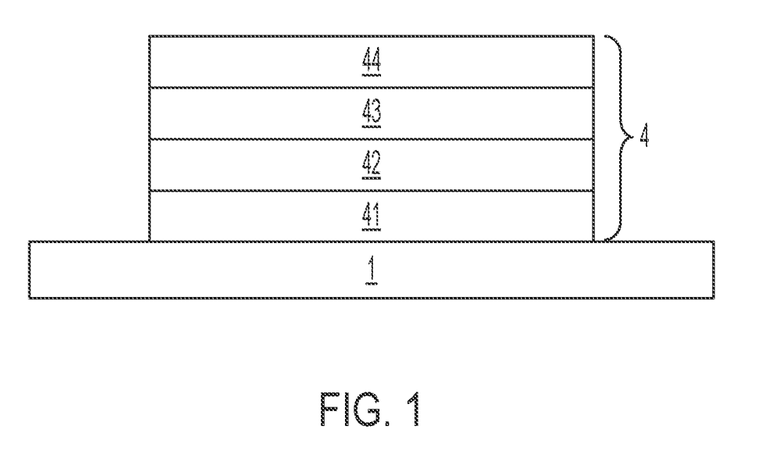
FIG. 1 a schematic cross-sectional view of a decoration on a web in an illustrative embodiment.

FIG. 1 depicts a schematic cross-sectional view of a decoration 4 formed on a web 1. The decoration 4 includes a first decoration layer 42 (e.g., an overcoat layer), which forms the outermost exposed layer of the decoration when the decoration is applied to the substrate. The decoration further includes one or more indicia layers 43, and an adhesive layer 44, such as a pressure sensitive adhesive layer, which is exposed on a surface of the decoration facing outwardly from the web 1. Each of the layers of the decoration 4 may be formed in register with one another at one or more decoration forming stations to form the decoration. However, it should be understood that registration of the various layers may not require perfect overlap of the layers as illustrated. For example, in some instances, one or more indicia layers 43 may be formed over only a portion of a decoration 4 to provide a desired appearance or arrangement of features in the decoration. In some embodiments, a release layer 41 may be formed between the web 1 and the first decoration layer 42. The release layer may aid in releasing the decorations 4 from the web 1 when the decorations are applied to substrates at an application station.

Figure 2:
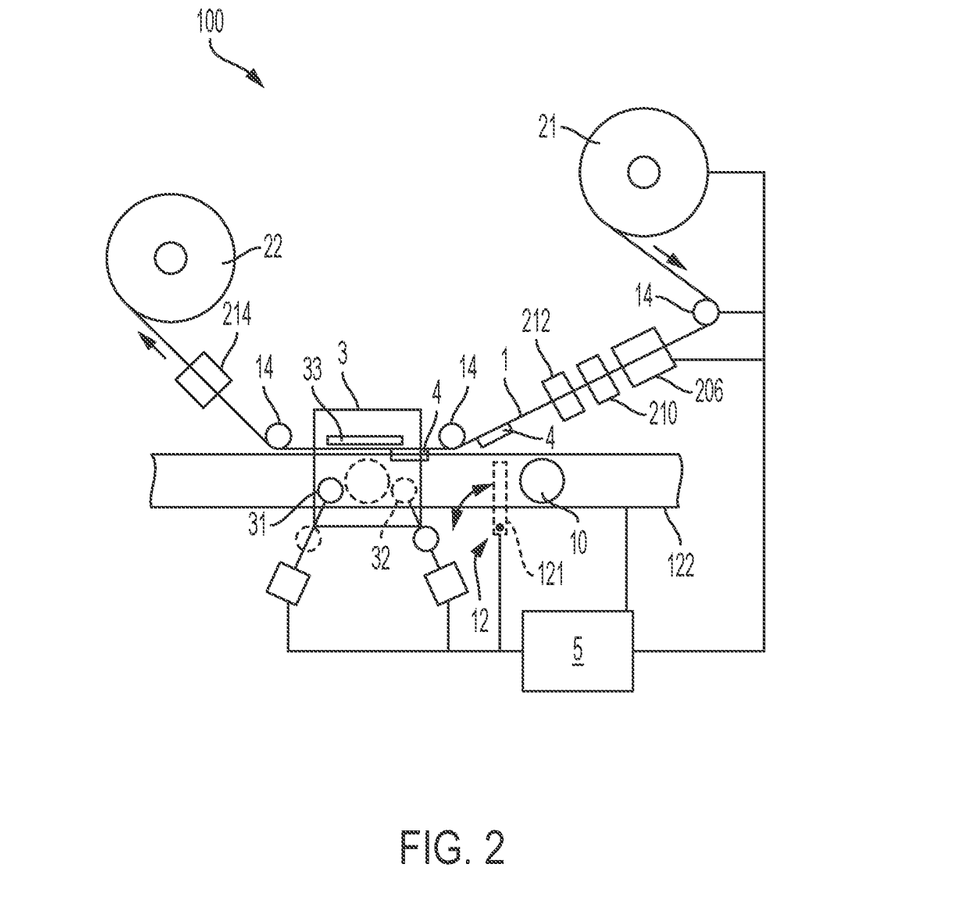
FIG. 2 is a schematic view of a system for decorating substrates in an illustrative embodiment.

FIG. 2 depicts an illustrative embodiment of a system 100 for decorating substrates 10. The system includes a web 1 that travels along a web path from a web supply roll 21 to a web take-up roll 22. The system includes one or more web guides 14 such as rollers (e.g., drive, idle, and/or tension rollers) and other components known in the art for controlling various aspects or characteristics of the web 1. These characteristics may include a direction or velocity of the web, a web tension, a web alignment, and/or a position of the web along a direction transverse to a direction along which the web travels (e.g., to adjust the vertical alignment of the web and decorations relative to the substrates). The system may include any suitable number and/or arrangement of web guides and/or other components to guide and/or control a web as desired (e.g., to define a desired web path) as the current disclosure is not limited in this regard.

The web guides 14 are arranged to guide the web from the supply roll 21 to a decoration forming station 206 where decorations are formed on the web 1. At the decoration forming station 206, the various layers of the decorations, such as the overcoat layer, indicia layer(s), adhesive layer, and release layer (if included) can be formed on the web. It should be understood that a decoration may be formed or deposited on the web in any suitable manner. For example, in some embodiments, the decoration forming station 206 includes an inkjet printing system with one or more print heads arranged to deposit the various decoration layers onto the web in register with one another to form the decorations. In other embodiments, the decoration forming station 206 may include a flexographic printing system, or any other suitable printing system, as the disclosure is not limited to any particular system or method for depositing the decoration layers onto the web. Moreover, it should be understood that the various layers of decoration may be formed using any number of suitable processes or systems. For instance, in some embodiments, the pressure sensitive adhesive layer may be formed using substantially the same processes as those used to form other layers of the decoration. Alternatively, the pressure sensitive adhesive layer may be formed using a different process than the process(es) used to form the other decoration layers.

In some embodiments, a curing station 210 is provided between the decoration forming station 206 and the application station 3. For example, one or more decoration layers (e.g., the indicia layers) may be cured at the curing station 3 to permanently set the decoration layers in place relative to one another. As noted above, the curing station may be configured to apply any suitable curing process, such as curing via exposure to radiation (e.g., UV, visible light, thermal, or electron radiation), or a drying process such as exposure to hot air. Accordingly, it should be understood that the current disclosure is not limited to any particular curing process at the curing station. Moreover, while one curing station is depicted in this embodiment, it should be understood that the systems disclosed herein may include more than one curing station after a decoration forming station, and that each curing station may be configured to perform the same or different types of curing processes.

In some embodiments, the adhesive layer of the decorations may be activatable such that the adhesive increases its viscoelasticity and becomes tacky after activation. Accordingly, the system 100 may include an activation station 212 configured to apply a suitable activation treatment to activate the adhesive. For instance, in some embodiments, the adhesive may comprise a UV activatable pressure sensitive adhesive, and the activation station 212 is configured to expose the pressure sensitive adhesive layer to ultraviolet radiation with a broad spectrum ultraviolet radiation source and/or an LED-based ultraviolet light source. Similar to the curing station 210, the activation station 212 may be configured to apply any suitable activation process, such as activation via exposure to radiation (e.g., UV, visible light, thermal, or electron radiation), or a drying process such as exposure to hot air. Accordingly, it should be understood that the current disclosure is not limited to any particular activation process at the activation station.

After the decorations are formed on the web, the decorations are transported on the web to an application station 3 where the decorations are applied to the substrates 10. After application of the decorations, the web 1 is collected at the take-up roller 22 positioned along the web path after the application station 3. In some embodiments, a cleaning station 214 may be positioned along the web path, such as between the application station 3 and the take-up roll 22. The cleaning station 214 may be configured to remove material from the web 1, e.g., to prepare the web for reuse in applying decorations to substrates. However, in some embodiments, the system 100 need not include the decoration forming station 206, curing station 210, activation station 212 and/or cleaning station 214. Instead, decorations 4 can be preformed on the web 1 and the system 100 used only to transfer the decorations 4 from the web 1 to substrates 10.

At the application station 3, the adhesive layer of the decorations 4 may be brought into contact with substrates 10, and the adhesion between the adhesive layer and the substrates 10 may cause the decorations to release from the web 1 and adhere to the substrates. For example, the adhesive force between the adhesive layer and the substrates 10 may be selected to be larger than an adhesive force between the decorations and the web, thereby allowing the contact with the substrates to pull the decorations off of the web. As noted above, in some instances, a release layer may be formed between the web and an overcoat layer of a decoration. The release layer may be configured to facilitate release of the decoration from the release layer when the pressure sensitive adhesive layer of the decoration is brought into contact with the substrate.

In some embodiments, the decorations may be directly transferred from the web to the substrate, such that the decorations are always supported by either the web or the substrate. In other embodiments, an application station may include one or more features to assist with applying a decoration from a web to a substrate. For instance, an adhering force between the decorations and the web may be similar in strength to an adhering force between the adhesive layer of the decorations and the substrate. Therefore, it may be advantageous to assist with releasing the decorations from the web at the application station to ensure proper application of the decoration to the substrate. In some embodiments, components may be provided at the application station to forcibly press the decorations into contact with the substrate, which may increase the adhesion force between the adhesive layer of the decoration and the substrate.

In some embodiments and as illustrated in FIG. 2, the substrates 10 may be provided by a substrate transport 12, e.g., including a conveyor to move the substrates towards and from the application station 3. While a conveyor is shown in the figures, it should be understood that the systems described herein are not limited to any particular arrangements for transporting substrates to the application station 3. For example, other arrangements, such as rotary or screw style transport systems may be suitable. In some cases, the substrate transport 12 can include a portion configured to contact substrates 10 at the application station 3 and urge the substrates 10 into contact with the web 1 and/or a decoration 4 on the web 1. For example, the substrate transport 12 can include a moving belt that contacts substrates 10 on a side opposite the web 1 to urge the substrates 10 into contact with the web 1 and a decoration 4 at the application station 3.

In some embodiments, a web control system may control movement of the web 1 along the web path. For example, the web control system may be configured as part of a controller 5 (e.g., including sensors, actuators, executable software for performing various control functions, etc.) to stop or slow or otherwise adjust movement of the web to facilitate deposition of the various layers of a decoration at the decoration forming station to form a decoration and/or to transfer a decoration to a substrate at the application station 3. In some embodiments, the web control system may be configured to control movement of a portion of the web at the application station 3, and while the web is moving, the movement of the substrates 10 at the application station 3 may impart relative motion between the decoration positioned at the application station and a substrate. Such relative movement can effect transfer of a decoration to a substrate. In some embodiments, a substrate 10 can be stopped at the application station 3 and the web 1 moved appropriately to transfer a decoration 4 to the substrate 10. In some cases, movement of the web 1 at the application station 3 can cause the substrate to rotate at the application station 3 as a decoration 4 is transferred to the substrate 10. Thus, the substrate and decoration may be brought into contact at the application station, and relative movement may result in the decoration being applied to the substrate, (e.g., by transferring directly from the web to the substrate). After (or during) application of the decoration from the web to the substrate, the web control system may subsequently move the web 1 to move another decoration 4 to the application station.

In some embodiments, the application station 3 can include components to control movement of substrates 10 at the application station 3. For example, in some embodiments, first and second rollers 31, 32 can be provided to control movement of substrates 10 and/or transfer of decorations 4 to substrates 10 at the application station 3. A substrate transport 12 can include a portion such as a conveyor 122 to move substrates 10 along a substrate path and first and/or second rollers 31, 32 can move in a direction transverse to the substrate path to interact with substrates 10. In some cases, the first and second rollers 31, 32 can be independently movable from a retracted position in which the roller 31, 32 is out of a substrate path along which substrates 10 move to and from the application station 3 and an extended position in which the roller 31, 32 is positioned in the substrate path. In some cases, the first roller 31 can operate to position a substrate 10 at the application station 3 to receive a decoration 4. For example, the first roller 31 can be moved to the extended position and the conveyor 122 or other substrate transport portion can move a substrate 10 along the substrate path until the substrate 10 contacts the first roller 31. When the substrate 10 contacts the first roller 31, the substrate 10 may be suitably positioned to receive a decoration 4. In some cases, the substrate transport need not operate to precisely position substrates 10 at the application station 3. For example, substrates 10 may be carried by a conveyor 122 to the application station 3 that never stops its movement. Instead, the conveyor 122 may run continuously to move substrates 10 to the application station 3. When a substrate 10 contacts the first roller 31, the substrate 10 may stop movement with the conveyor 122, which may continue to move below the substrate 10. Since the first roller 31 is in the substrate path, the first roller 31 can in some cases prevent the substrate 10 from exiting the application station 3 even though the substrate transport 12 may continue to attempt to urge the substrate 10 to exit. For example, a substrate 10 in contact with the first roller 31 can also contact the web 1 and/or a support 33 adjacent the web 1 so that the substrate 10 cannot move to exit the application station 3. In some cases, the first roller 31 itself may prevent exit of the substrate 10, e.g., the first roller 31 can have a fence or other component that blocks movement of the substrate 10 past the first roller 31. In cases where the conveyor 122 or other substrate transport portion operates continuously to move substrates toward and/or from the application station 3, substrates 10 may be metered or otherwise controlled for entry into the application station 3 by a gate 121, the second roller 32 and/or another component that prevents substrates 10 from moving to the application station 3 until an appropriate time. For example, the controller 5 can operate the gate 121 pivot counterclockwise as shown to a position out of the path of the substrates 10 so that a substrate 10 is released for movement to the application station 3 at an appropriate time and/or position for receiving a decoration 4. In some cases, the controller 5 can include one or more sensors to determine the relative positions and/or speeds of a decoration 4 and substrate 10 and control movement of the substrate 10 and web 1 to achieve decoration transfer in a desired way. For example, the controller 5 can control web/decoration movement and/or substrate movement at the application station 3 so that decorations 4 are applied to a desired location on substrates 10, e.g., a particular vertical or horizontal position on a bottle. The gate 121 can be pivoted clockwise back into the substrate path to block other substrates 10 from movement to the application station 3 until an appropriate time. Although a gate 121 is shown in FIG. 2, any suitable device or mechanism for controlling movement of substrate 10 can be employed, such as screw feeders, pick-and-place devices, etc. Alternately, the substrate transport may move substrates 10 in a more controlled manner, e.g., the conveyor 122 may operate to move a substrate 10 to the application station 3 and then stop when the substrate 10 is appropriately positioned, e.g., in contact with the first roller 31 or otherwise suitably close to the first roller 31. With the substrate 10 suitably positioned at the application station 3 (e.g., in contact with or adjacent the first roller 31), the second roller 32 may be moved to the extended position in the substrate path. Note that in the extended position, the second roller 32 can be positioned in the substrate path and may be employed to meter, gate or otherwise control movement of substrates 10 to the application station 3. Thus, the controller 5 can operate the second roller 32 to function as a gate or other device to meter or otherwise control movement of substrates 10 to the application station 3. For example, with the second roller 32 in the extended position, substrates 10 upstream of the second roller 32 can be prevented from moving to the application station 3. The second roller 32 can be retracted to permit one or more substrates 10 to move to the application station 3 and then moved to the extended position to prevent further substrates 10 from moving to the application station 3.

With the first and second rollers 31, 32 in the extended position and a substrate in a space between the rollers, the substrate 10 may be trapped between the rollers 31, 32 and a portion of the web 1 (or the support 33) at the application station 3. In this condition, the first and second rollers 31, 32 and the support 33 can urge the substrate 10 into contact with the web 1 and a decoration 4 on the web 1. The support 33 can be arranged in different ways, such as a third roller, movable or stationary belt, a stationary plate, etc. that is positioned on a side of the web 1 opposite the substrate 10. The web control system can operate (e.g., under the direction of the controller 5) to move the web 1 and a decoration 4 so that the decoration 4 moves relative to the substrate 10. This relative movement can cause transfer of the decoration 4 to the substrate 10. For example, movement of the web 1 and decoration 4 can cause the substrate 10 to rotate. In some cases, adherence of the decoration 4 to the substrate 10 and to the web 1 can cause the substrate 10 to be rotated by web movement. However, as the surface of the substrate 10 that has an adhered decoration 4 moves away from the web 1 on the trailing side, the decoration 4 can be pulled from the web 1 and transferred to the substrate 10. In some cases, movement of the support 33, such as a third roller or movable belt, can cause the substrate 10 to rotate. The web 1 and decoration 4 can be moved along with the support 33 to transfer the decoration 4 to the rotating substrate 10. However, in either case, the web 1 moves relative to a center of mass and/or a center of rotation of the substrate 10 to cause transfer of the decoration 4 to the substrate 10.

In some cases, the first and second rollers 31, 32 and/or the web support 33 can apply a variable and/or controlled pressure to a substrate 10, and the pressure applied by a roller 31, 32 and/or support 33 can be independent of another roller 31, 32 or support 33. For example, the first and/or second roller 31, 32 can apply different forces or pressure to the substrate 10, and the force or pressure applied by the rollers 31, 32 can be varied or controlled. For example, before a substrate 10 contacts a decoration 4 on the web 1, the force applied by the rollers 31, 32 may be relatively less than the force applied while the decoration 4 is being transferred to the substrate 10. In some cases, one roller 31, 32 may apply a greater or variable or otherwise different force as compared to the other roller 31, 32, and such forces can be applied before, during and/or after a decoration 4 is transferred to the substrate 10. For example, the first and second rollers 31, 32 may apply a same force during decoration transfer to a substrate 10, and after transfer, the second roller 32 may apply a relatively smaller or no force to the substrate 10. Thus, when the first roller 31 is moved to the retracted position to permit the substrate 10 to exit the application station 3, the second roller 32 may apply no force to the substrate 10 and the substrate transport 10 may move the substrate 10 from the application station 3. In some cases, the second roller 32 may apply an increased force after decoration transfer, e.g., such that the second roller 32 pushes the substrate 10 from the application station 3 after the first roller 31 is retracted. In some cases, the rollers 31, 32 can be controlled to apply a particular force to the substrate 10, e.g., the actuators used to move the rollers 31, 32 can be adjusted so the force applied to the substrate 10 is within a desired threshold of a target force.

With the decoration 4 transferred to the substrate 10, the substrate 10 can exit the application station 3. To do so, the first roller 31 can be moved to the retracted position out of the substrate path. This can permit the substrate 10 to move from the application station 3. For example, if the conveyor or other substrate transport operates continuously to move substrates 10, movement of the first roller 31 to the retracted position can permit the conveyor to move the substrate 10 from the application station 3. In some cases, the first roller 31 can be moved to the retracted position and the substrate transport can be activated to move the substrate 10 from the application station 3. The second roller 32 can be moved to the retracted position as well, whether before, simultaneously or after movement of the first roller 31. This movement of the second roller 32 can permit a next substrate 10 to move to the application station 3 and another decoration transfer operation to be performed.

FIG. 2 shows the controller 5 schematically linked to the first and second roller 31, 32, the decoration formation station 206, the web guides 14, the web roll 21, the gate 121 and substrate transport 12. It should be understood that the controller 5 can include one or more components to receive input from (such as sensor data) and provide output to (such as control signals) to any of the components of the system 100 including those shown having links with the controller 5 and others. For example, while links to the curing station 210, activation station 212, and cleaning station 214 are not shown for clarity, the controller 5 can be coupled to any of these components and others to provide input/output, control, display and other functions as desired. The controller 5 can include any suitable components for performing its functions, including a user interface, a programmed processor and/or other data processing device or devices along with suitable software or other operating instructions that are executable by the data processing device to perform any of the functions described herein or otherwise, one or more memories (including non-transient storage media that can store software and/or other operating instructions), sensors, input/output interfaces, communication devices (e.g., including a transceiver, radio, gateway, interface, etc. suitably programmed or otherwise configured to communicate using any suitable wired or wireless protocol), buses or other links, a display, switches, relays, triacs, a battery or other power source or supply, actuators, motors, linkages or other devices to provide physical movement, or other components necessary to perform desired input/output, control or other functions. A user interface can be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on. As another example, the first and second rollers 31, 32 can include any suitable actuators such as linear motors, hydraulic or pneumatic actuators, linkages, and so on to move the rollers 31, 32 between retracted and extended positions. The controller 5 can include motor drives to rotate the rollers 31, 32 as suitable, as well as to move components of the support 33 or other elements of the system 100.

In some embodiments, a method for transferring a decoration 4 to a substrate 10 can include moving a first roller 31 to an extended position at an application station 3, and moving a substrate 10 along a substrate path toward the first roller 31 at the application station 3. The first roller 31 in the extended position can be located in the substrate path on a downstream side of the substrate 10. Thus, the substrate 10 can be moved by the substrate transport 12 until the substrate 10 contacts the first roller 31 or is otherwise suitably adjacent the first roller 31. Also, the first roller can be positioned to prevent the substrate from moving past the first roller to exit application station. A second roller 32 can be moved to an extended position at the application station 3, and the second roller 32 in the extended position can be located in the substrate path on an upstream side of the substrate 10. Thus, the substrate 10 can be positioned in a space between the first and second rollers 31, 32, and the substrate 10 can be trapped between the first and second rollers 31, 32 and a portion of the web 1 at the application station 3 and/or a support 33 for the web. A portion of the web bearing a decoration 4 can be moved at the application station to transfer the decoration to the substrate 10. For example, the first and second rollers 31, 32 can be arranged to urge the substrate 10 into contact with the web 1 and/or decoration 4, and movement of the web 1 and decoration 4 relative to the substrate 10 can cause the decoration 4 to contact the substrate 10 and be transferred. This movement can cause the substrate to rotate during transfer of the decoration from the web to the substrate, and the first and second rollers can contact the substrate 10 during rotation of the substrate 10 and urge the substrate 10 into contact with the decoration 4 and the web 1, e.g., to enhance a contact force to aid in transfer. In other cases, the substrate 10 need not be rotated by the web 1 and decoration 4, but rather may be rotated by another component such as the first and/or second roller 31, 32 and/or a third roller or belt 33 associated with the web 1 at the application station 3. The web 1 may be moved to transfer the decoration 4 to the substrate 10, but the movement of the web 1 and decoration 4 itself need not cause rotation of the substrate 10. With the decoration transferred, the first roller can be moved to a retracted position that is out of the substrate path, and the substrate bearing the decoration can be moved from the application station along the substrate path. The second roller 32 can also be moved to a retracted position that is out of the substrate path to permit a second substrate 10 to be moved toward the first roller 31 at the application station.

Figure 3:
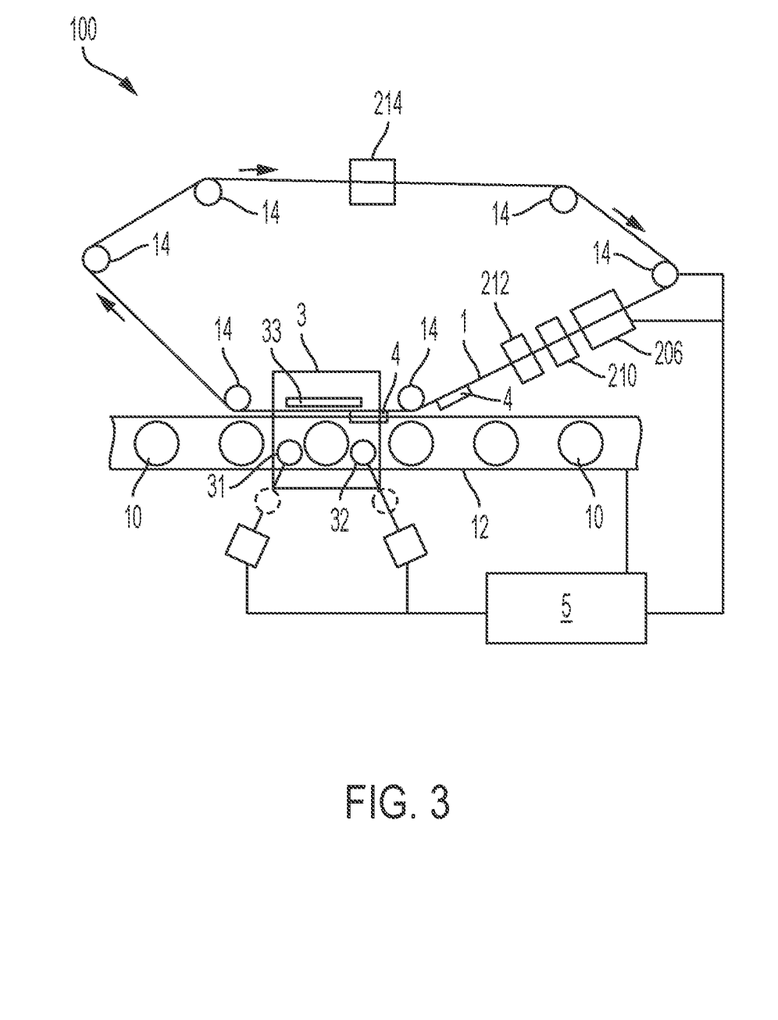
FIG. 3 is a schematic view of a system for decorating substrates including a web formed as a continuous loop in an illustrative embodiment.

As discussed previously, in some embodiments, a reusable web may be formed as a continuous loop. For example, FIG. 3 depicts an embodiment of a system 100 for decorating substrates 10 similar to the embodiment discussed above in connection with FIG. 2, but in which the web 1 forms a continuous loop. In particular, the system 100 includes web guides 14 arranged to guide the web from the application station 3 back to the decoration forming station 206. Additionally, the system 100 may include a cleaning station 214 positioned along the web path between application station 3 and the decoration forming station 206 to clean the web 1. Otherwise, the FIG. 3 embodiment can include and/or omit any features of the FIG. 2 embodiment.

Figure 4:
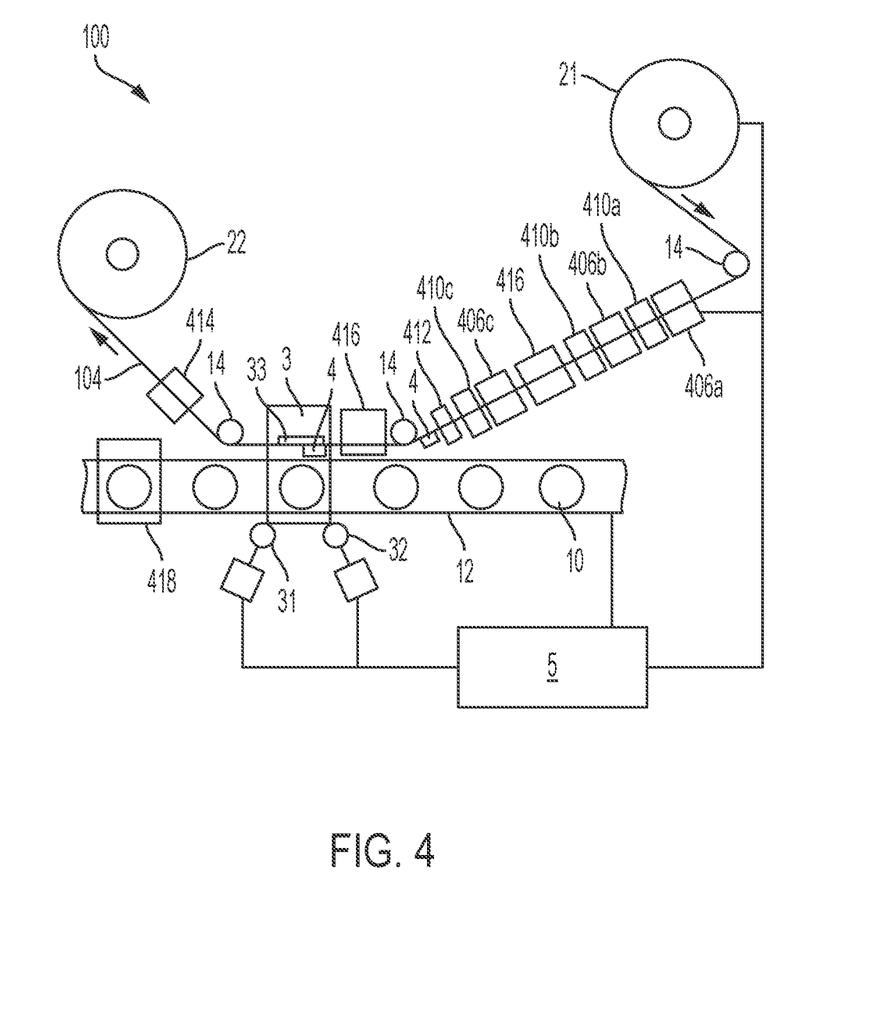
FIG. 4 is a schematic view of a system for decorating substrates including multiple decoration forming stations in an illustrative embodiment.

FIG. 4 depicts another embodiment of a system 100 for decorating substrates 10. Similar to the embodiments discussed above in connection with FIG. 2, the system 100 includes a web 1 that travels along a web path from a web supply roll 21 to a web take-up roll 22, as well as a web control system including one or more web guides 14. The system further includes an application station 3 and a substrate transport 12 arranged to transport substrates 10 to the application station 3 where decorations 4 are applied to the substrates 10.

In some embodiments, the system 100 can include three decoration forming stations 406a, 406b, and 406c, and three curing stations 410a, 410b and 410c positioned along the web path before the application station 3. Each decoration station is configured to form a portion of the decoration. For example, the first decoration station 406a may be configured to deposit the overcoat layer of a decoration, the second decoration station 406b may be configured to deposit the indicia layer(s) of the decoration, and the third decoration station 406c may be configured to deposit the adhesive layer of the decoration. As noted previously, each layer may be deposited in register with the other layers to form the decoration. Each curing station 410a, 410b, and 410c is positioned along the web path after an associated decoration forming station, and each curing station may be configured to cure the layer(s) deposited at its associated decoration forming station. For instance, the first curing station 410a may be configured to cure the layer(s) deposited at the first decoration forming station 406a before subsequent layers of the decoration are formed and cured at the second and third decoration forming stations and curing stations, respectively.

While three decoration forming stations 406 and associated curing stations 410 are depicted in FIG. 4, it should be understood that the current disclosure is not limited to any particular number of decoration forming stations and/or curing station used to form a decoration on the web. For example, in some embodiments, a system may include two decoration forming stations and curing stations, or more than three decoration forming stations and curing stations. Moreover, in some embodiments, the number of curing stations may be different than the number of decoration forming stations. For example, a single curing station may be configured to cure layers of a decoration deposited at multiple decoration forming stations.

As illustrated in FIG. 4, the system 100 may further include an activation station 412 at which an activatable adhesive layer may be activated (if required). However, as discussed above, a curing station (e.g., curing station 410c) may be configured to activate the activatable adhesive layer, and thus the activation station may not be included in some embodiments. Additionally, in some embodiments, a second adhesive activation station 418 may be positioned after the application station 3. This second activation station 418 may be configured to apply an activation or curing treatment to the adhesive after a decoration 4 has been applied to a substrate 10. For example, the second activation station 418 may be configured to apply UV radiation to the adhesive to at least partially cure (or otherwise activate) a UV-curable adhesive. However, it should be understood that activation of the adhesive prior to application (e.g., at activation station 412 or curing station 410c) may be sufficient in some applications, and thus the second activation station 418 may not be included in some embodiments. Similar to the embodiments discussed above in connection with FIGS. 2 and 3, the system 100 also may include a cleaning station 414 configured to clean the web 1 to prepare the web for subsequent formation of decorations on the web and/or any other features of the FIGS. 2 and 3 embodiments.

In some embodiments, a system for decorating substrates may include one or more features to aid in controlling the web 1, such as festoons 416 to aid in containing the web along different portions of the web path. For example, the festoons 416 may be configured to define a variable path length through which the web travels in order to allow accumulation of the web within the festoons. As illustrated, festoons 416 may be positioned at one or more locations along the web path, such as prior to the application station 3 and/or between curing stations and decoration stations (e.g., between curing station 410b and decoration station 406c) and/or after the application station 3. The festoons 416 may permit the web 1 to travel at different speeds in various portions of the web path, such as at the decoration forming stations, curing stations, application station, etc. Also, festoons or other similar features can be employed in systems 100 that do not form a decoration on the web, but rather apply pre-formed decorations from a web to substrates.

Figure 5:
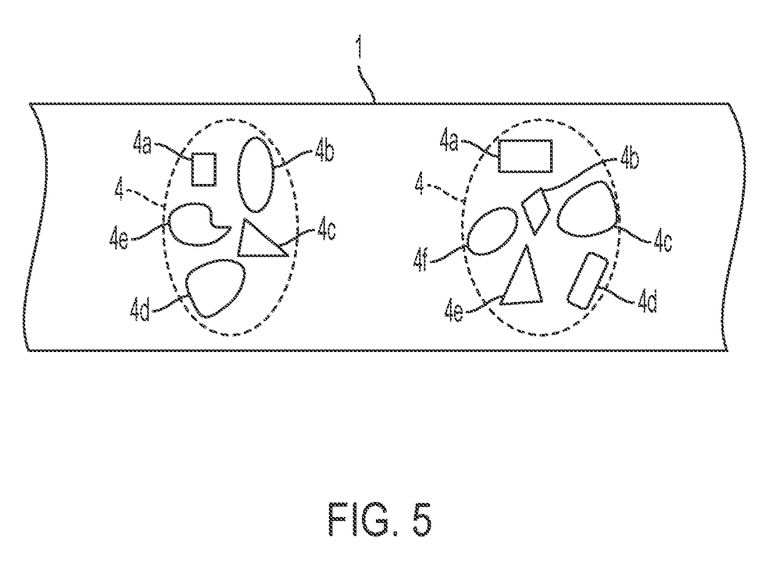
FIG. 5 is a schematic representation of decorations including multiple elements on a web.

As discussed above, in some instances, a decoration may include two or more physically separate components that together make up a single decoration. For example, FIG. 5 depicts a portion of a web 1 with two decorations 4 formed thereon. Each decoration includes multiple separate decoration elements 4a-4f. When the decorations 4 are applied to substrates, the decoration components 4a-4f of each decoration 4 are applied together in register with one another and work together to form a single decoration on the substrate. Depending on the particular embodiment, a decoration may include any suitable number of separate decoration components 4a-4f, and each decoration component may have any suitable shape, orientation, color, pattern, and so on. For example, each decoration component could be graphic design composed of two or more separate features. In other instances, each decoration may be a text string (e.g., a word, phrase or number), and the decoration components may include individual text characters that together form the text string. Moreover, combinations of different types of decoration components (e.g., graphical, text, or other types of decoration elements) may be included within a single decoration.

As illustrated in FIG. 5, in some embodiments, different decorations 4 formed on a web may be different from one another. For example, each decoration may have include different types, number, and or arrangements of decoration components to form different decorations. In some instances, a system may be configured to form customized decorations for each substrate to be decorated. For example, such arrangements may facilitate individualized labeling runs in which each substrate (e.g., containers) are decorated with individualized labels. However, it should be understood that the current disclosure is not limited to systems utilizing variable printing arrangements, and thus each decoration formed on the web and applied to substrates may be substantially identical in some embodiments.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for decorating a substrate, comprising:
moving a first roller to an extended position at an application station;
moving a substrate along a substrate path toward the first roller at the application station, the first roller in the extended position being located in the substrate path on a downstream side of the substrate;
moving a second roller to an extended position at the application station, the second roller in the extended position being located in the substrate path on an upstream side of the substrate;
moving a portion of a web bearing a decoration at the application station to transfer the decoration to the substrate;
rotating the substrate during transfer of the decoration from the web to the substrate, the first and second rollers contacting the substrate during rotation of the substrate and urging the substrate into contact with the decoration and the web;
moving the first roller to a retracted position that is out of the substrate path; and
moving the substrate bearing the decoration out of the application station along the substrate path.

2. The method of claim 1, wherein in the extended position, the first roller is positioned to prevent the substrate from moving past the first roller to exit the application station.

3. The method of claim 1, wherein moving the substrate includes moving the substrate along a first direction, and moving the first roller to the extended position includes moving the first roller in a direction transverse to the first direction.

4. The method of claim 1, wherein moving the substrate includes moving the substrate along the substrate path until the substrate contacts the first roller.

5. The method of claim 1, wherein moving the second roller includes trapping the substrate in a space between the first and second rollers and a portion of the web.

6. The method of claim 1, wherein rotating the substrate includes engaging the substrate with the portion of the web such that movement of the portion of the web at the application station causes the substrate to rotate.

7. The method of claim 1, wherein rotating the substrate includes positioning the portion of the web bearing the decoration between the substrate and a support surface, wherein the first and second rollers in the extended position and the support surface are configured to urge the substrate into contact with the portion of the web.

8. The method of claim 7, wherein the support surface includes a third roller, a belt or plate.

9. The method of claim 1, further comprising moving the second roller to a retracted position that is out of the substrate path to permit a second substrate to be moved toward the first roller at the application station.

10. The method of claim 1, wherein moving the portion of the web and rotating the substrate occur simultaneously.

11. The method of claim 1, wherein the decoration includes an adhesive that is exposed and is on a side of the decoration opposite the web.

12. The method of claim 1, wherein rotating the substrate during transfer of the decoration includes transferring the decoration from the web directly to the substrate.

13. A system for decorating substrates, comprising:
a web including a plurality of decorations on a first side of the web, each decoration having an adhesive exposed on a surface of the decoration facing outwardly from the first side of the web;
an application station at which the decorations are applied from the web to substrates;
a web path along which the web travels to transport the decorations to the application station;
a web control system configured to control movement of the web along the web path;
a substrate transport configured to move a substrate along a substrate path to the application station and from the application station; and
first and second rollers at the application station that are independently movable between respective extended and retracted positions, the first and second rollers being positioned in the substrate path in the extended position and being positioned out of the substrate path in the retracted position.

14. The system of claim 13, further comprising a controller configured to control operation of the web control system and the first and second rollers to cause decorations to be transferred from the web to substrates at the application station, the controller configured to move the first roller to the extended position and into the substrate path to contact a substrate moved to the application station by the substrate transport and prevent the substrate from exiting the application station prior to transfer of a decoration to the substrate, to move the second roller to the extended position after the substrate is positioned in a space between the first and second rollers, and to move the first roller to the retracted position out of the substrate path after transfer of the decoration to the substrate to permit the substrate to exit the application station.

15. The system of claim 13, wherein the first and second rollers and the web path are configured such that the substrate is trapped between the first and second rollers and the web with the substrate in contact with the first roller and the first and second rollers in the extended position.

16. The system of claim 13, wherein the substrate transport includes a conveyor that moves the substrates in a linear direction to the application station and from the application station.

17. The system of claim 16, wherein the first and second rollers are movable in directions transverse to the linear direction.

18. The system of claim 13, further comprising a controller configured to move the web and a decoration at the application station with a substrate in contact with the first roller and the first and second rollers in the extended position to transfer the decoration to the substrate.

19. The system of claim 18, wherein the web, web path and first and second rollers are configured such that movement of the web and decoration at the application station causes the substrate to rotate during transfer of the decoration to the substrate.

20. The system of claim 18, wherein the web path includes a support surface arranged to urge the web and decoration into contact with the substrate at the application station with the first and second rollers in the extended position.

21. The system of claim 18, wherein the support surface includes a third roller, a belt or plate.

22. The system of claim 13, further comprising a controller configured to move the first roller to the extended position and subsequently move the second roller to the extended position to trap the substrate between the first and second rollers and a portion of the web at the application station before the decoration is transferred to the substrate.

* * * * *